J. A. MURR.
FEED RACK.
APPLICATION FILED APR. 13, 1914.
1,137,653.
Patented Apr. 27, 1915.
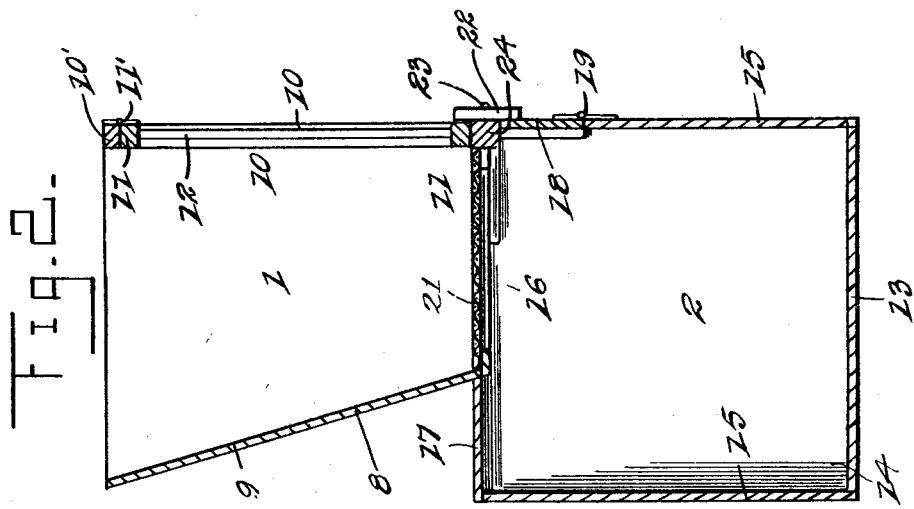
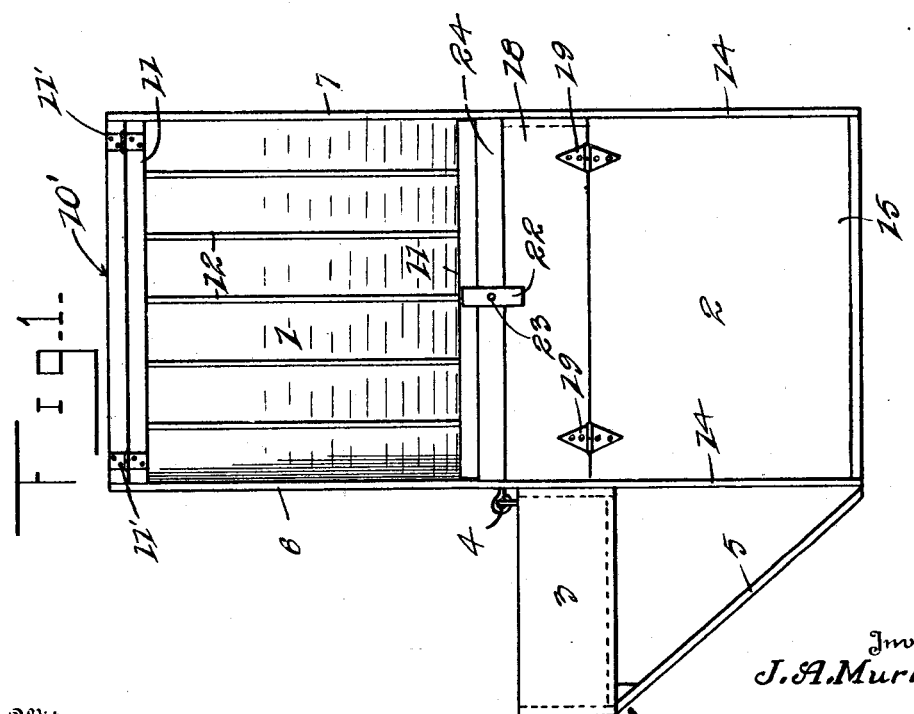

UNITED STATES PATENT OFFICE.

JOHN A. MURR, OF COHUTTA, GEORGIA.

FEED-RACK.

1,137,653.  Specification of Letters Patent.  Patented Apr. 27, 1915.

Application filed April 13, 1914. Serial No. 831,577.

*To all whom it may concern:*

Be it known that I, JOHN A. MURR, a citizen of the United States, residing at Cohutta, in the county of Whitfield and State of Georgia, have invented certain new and useful Improvements in Feed-Racks; and I do hereby declare the following to be a full, clear, and exact description of the invention, such as will enable others skilled in the art to which it appertains to make and use the same.

This invention relates to new and useful improvements in feed racks, and has for its principal object to provide a feed rack which is adapted to hold hay and similar material which is to be fed to horses or other live stock.

Another object of this invention is to provide a feed rack having a receptacle thereunder to hold the seed from the feed and thereby eliminate much of the waste usually accompanying the feeding of live stock.

Heretofore it has been the practice in feeding animals to pay no attention whatever to the seed from the grass and hay which fall from the hay rack on to the floor of the stall. Since considerable expense is entailed each year in the purchase of seed of the desired kind, the idea of saving the waste seed falling from the feed in the hay rack has developed and the principal object of this invention is to provide a means whereby these seed may be easily, cheaply and economically separated from the feed and preserved in a suitable receptacle below the hay rack so that they may be used for the following season.

With the above and other objects in view, the invention consists in the novel combination and arrangement of parts which will be fully set forth in the following specification and accompanying drawings, in which, Figure 1 is a front view in elevation of a hay rack constructed in accordance with this invention, and Fig. 2 is a transverse sectional view taken through the center thereof.

Referring now to the drawings by characters of reference, the numeral 1 designates as an entirety the hay rack, while the numeral 2 designates the seed receptacle. A suitable corn box 3 is removably secured to the side of the seed receptacle as at 4, and the free end of said box is supported by the bracket 5.

Taking up the description of the hay rack which is indicated generally by the numeral 1, the same is formed by the end walls 6 and 7 which are provided with the angular edges 8 against which the back 9 is adapted to rest.

The front wall of the rack which is designated generally by the numeral 10, preferably comprises the horizontal bars 11 which are connected by the vertical bars 12. This wall 10 is hinged to the transverse bar 10' as at 11' and is arranged to swing outwardly as clearly illustrated in Fig. 2.

Passing now to the description of the seed receptacle which has been hereinbefore referred to by the numeral 2, the same is preferably formed by the bottom 13, ends 14, and sides 15. A suitable frame 16 is secured to the end walls and is preferably of less width than the width of the box. Secured to the end walls 14 is provided the top 17 which is of sufficient width to cover the space between the frame 16 and the rear wall of the receptacle 2. The front wall of the receptacle is preferably made of two sections and the upper section designated by the numeral 18, is hingedly secured as at 19 to the fixed portion of the wall. Thus it will be seen that access may be had to the interior of the chambers when it is so desired.

Secured to the frame 16 is the screen wire 21 which is arranged to prevent the hay or similar feed from passing into the lower receptacle 2 when the device is in use.

A suitable turn button 22 is pivotally secured as at 23 to the cross bar 24 and is arranged to be turned as shown in the drawings to hold the front 10 and closure 18 in their closed position.

It will be apparent from the foregoing that in use, hay or similar feed is placed in the receptacle 1 and it will be apparent that it will fall toward the bottom of said receptacle and may be pulled from the receptacle between the bars 12. It will be apparent that any seed which may be in the feed will be shaken loose and will fall to the bottom of the receptacle and through the screen 21 to the lower receptacle. When it is desired to remove the contents of the lower receptacle it will be apparent that the only necessary operation is to open the swinging panel 18 and remove the contents through the opening thus formed.

While in the foregoing there has been shown and described the preferred embodiment of this invention, it is to be understood that such changes may be made in the combination and arrangement of parts as will fall within the spirit and scope of the invention as defined in the appended claim.

Having thus described my invention, I claim:

A feeding device, including a hay rack comprising a casing having a front wall composed of a plurality of spaced bars, a foraminous bottom in the casing, the front wall of the casing being hinged at the top, a seed receiving chamber beneath the hay rack a hinged door in the front wall of the seed chamber, a turn button arranged to hold both the front wall of the hay rack and the door of the seed chamber closed and a removable grain box secured to the device at the top of the seed chamber.

In testimony whereof I affix my signature in presence of two witnesses.

JOHN A. MURR.

Witnesses:
R. H. ROLLINS,
DESSA WILSON.

Copies of this patent may be obtained for five cents each, by addressing the "Commissioner of Patents, Washington, D. C."